Jan. 24, 1961    R. Y. MINER ET AL    2,969,184
ELECTROMECHANICAL TARGET TRAVEL COMPONENT COMPUTER
Filed June 2, 1949
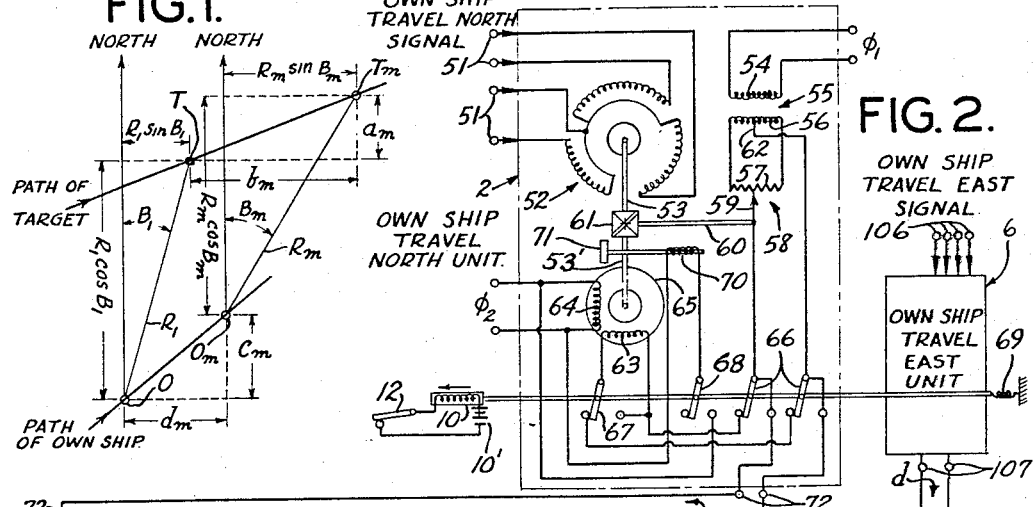
INVENTORS:
RICHARD Y. MINER, CLIFFORD
F. ABT, & QUENTIN J. EVANS.
BY
Their ATTORNEYS.

United States Patent Office 2,969,184
Patented Jan. 24, 1961

2,969,184
ELECTROMECHANICAL TARGET TRAVEL COMPONENT COMPUTER

Richard Y. Miner, New York, Clifford F. Abt, Long Island City, and Quentin J. Evans, deceased, New York, N.Y., assignors to American Bosch Arma Corporation Filed June 2, 1949, Ser. No. 96,688
20 Claims. (Cl. 235—187)

This invention relates to an electromechanical calculating system, and has particular application to a gun fire control system which produces and supplies signal voltages proportional to the north and east components of the distance traveled by a target vessel, and which continues to supply these voltages for any desired period.

It is well known that the solution of gun fire control problems may be derived from a knowledge of the distance traveled east and distance traveled north by the target during a specific interval of time, but prior computing apparatus utilizing this basis for solving such problems have been disproportionately complicated and have not been sufficiently accurate to give a reliable result.

In accordance with the present invention, an electromechanical calculating system is provided in which signal voltages, whose amplitudes are proportional to the distance traveled north and the distance traveled east by the target at each observation, are computed, memorized and supplied by the system from continuous inputs of the course and travel of the attacking ship, and intermittent inputs of separately-determined target range and bearing.

In the apparatus of this invention, a series of observations of target range and target bearing are made which are resolved into cardinal components giving the distances of the target north and east of the attacking vessel. The signal memorization is achieved in the new system by matching the output of an induction potentiometer to an incoming signal during the intervals between observations, and at the instant each observation is made by causing the incoming signal to be disconnected while the induction potentiometer rotor is held stationary so that its output remains equal to the value of the incoming signal voltage existing at the instant the incoming signal was disconnected. In this way, the cardinal components of the target movement north and east are directly obtained and supplied.

For a more complete understanding of the invention, reference may be had to the accompanying drawings, in which:

Figure 1 is a diagram illustrating a typical observation on which solution of the problem posed thereby is determined by the electromechanical calculating system of this invention; and Fig. 2 is a schematic electromechanical diagram illustrating the system of this invention.

Referring to Fig. 1 of the drawings, the letter O designates the observation or attacking ship, hereinafter called "own ship," moving generally northeast from the point of initial observation of the target T, moving northeast by east from the point at which it was initially observed, the corresponding courses of own and target ships being indicated by the vector arrows. The line of sight from own ship O to target T is designated $R_1$, being initial range, and lies at the angle $B_1$ with the north, the angle $B_1$ being initial target bearing. Hence, the north component is $R_1 \cos B_1$ and the east component is $R_1 \sin B_1$.

A series of separate observations, after the initial observation, are made, one of which $m$ being indicated in Fig. 1 when the target is at point $T_m$ and own ship at point $O_m$, so that present range is then $R_m$, present bearing is $B_m$, the north component is $R_m \cos B_m$ and the east component is $R_m \sin B_m$, as shown. Thus, at each observation subsequent to the initial observation, for example at the $m$th or present observation, the distance $a_m$ traveled north by the target T since the initial observation is found by subtracting the north component $R_1 \cos B_1$ of the initial range $R_1$ of the target, from the sum of the north component $R_m \cos B_m$ of the present range $R_m$ of the target and the distance $c_m$ traveled by own ship north during the time interval between the initial and present observations, i.e.:

$$a_m = (R_m \cos B_m) + c_m - (R_1 \cos B_1) \qquad (1)$$

Also, the distance $b_m$ traveled east by the target T since the initial observation is found by subtracting the east component $R_1 \sin B_1$ of the initial range $R_1$ of the target, from the sum of the east component $R_m \sin B_m$ of the present range $R_m$ of the target and the distance $d_m$ traveled east by own ship during the time interval between the initial and present observation, i.e.:

$$b_m = (R_m \sin B_m) + d_m - (R_1 \sin B_1) \qquad (2)$$

The distance traveled south by the target T is regarded as a negative travel north, and the distance traveled west by the target T is similarly considered to be a negative travel east.

Conventional target range and bearing measuring equipment will be understood to be mounted on the attacking ship, either in the form utilizing visual observation of the target or equivalent apparatus utilizing the time elapsed between a transmitted and a received signal as measures of range and bearing. The term "observation" as used herein is therefore considered to designate either means, or other equivalent means, for separately obtaining the range and bearing inputs to the system of this invention.

Referring now to Fig. 2 for a description of the electromechanical calculating system of this invention, it will be observed that it is composed of a number of components of which that designated 1 is the range and bearing unit; 2, the own ship travel north unit; 3, the memory unit for own ship travel north; 4, the initial range north unit; 5, the memory unit for target travel north; 6, the own ship travel east unit; 7, the memory unit for own ship travel east; 8, the initial range east unit; and 9, the memory unit for target travel east.

The sources of power are a common source of constant alternating two phase voltage, received at points $\phi_1$ and $\phi_2$, and direct current sources 10' and 11', which are indicated for convenience as batteries and which normally energize respective relay windings 10 and 11 when corresponding switches 12 and 13 are closed, as shown. The other relays 14 and 15 remain deenergized since keys 16, 17 are held open by springs until manually depressed, so that power sources 14' and 15' are normally disconnected from relay windings 14 and 15, respectively. This is the condition of relays 10, 11, 14 and 15 before operation, i.e., the "reset" condition.

Referring to the range and bearing unit 1, input signals derived from $\phi_1$ and corresponding to the relative target bearing $Br$ and the target range $R$ are received intermittently at terminals 18 and 19, respectively, from conventional self-synchronous transmitters not shown, but located in the aforementioned range and bearing detecting equipment installed elsewhere on own ship. Similarly, a signal corresponding to own ship course $Co$ also derived from $\phi_1$ is received at terminals 20 from own ship gyrocompass transmitter, not shown.

The signal $Br$ at terminals 18 is applied to the stator windings 21 of control transformer 22, the rotor winding 23 of which energizes control field winding 24 of motor 25, and is driven by shaft 26 thereof. Main field winding 27 of motor 25 is energized from $\phi_2$ so that motor 25 drives rotor winding 23 until the output voltage of rotor winding 23 is zero and the motor deenergizes itself. The displacement of shaft 26 accordingly corresponds to the relative target bearing $Br$. Shaft 26 is connected to and drives the rotor winding 28 of synchronous differential transmitter 30 whose stator windings 29 are excited by the own ship course signal $Co$ at terminals 20, so that the signal output of rotor windings 28 corresponds to $Br+Co$ or the true bearing B of the target.

The electrical signal B is applied to stator windings 31 of control transformer 32 and converted into a mechanical displacement of shaft 33 by motor 35, whose control field winding 34 is energized by the signal output of rotor winding 36 of control transformer 32, and whose main field winding 37 is energized from $\phi_2$ so that motor 35 drives shaft 33 and rotor winding 36 until the output voltage of rotor winding 36 is zero and motor 35 deenergizes itself. The displacement of shaft 33 accordingly corresponds to the true target bearing B.

The electrical signal corresponding to range R at terminals 19 is impressed on the stator windings 38 of control transformer 40 and converted into a mechanical displacement R of shaft 41 by the action of motor 42 energized by the output of rotor winding 43 of transformer 40, in a manner similar to the action of control transformer 22 and motor 25.

The constant voltage of $\phi_1$ is applied across resistance winding 44 of linear potentiometer 45, the movable brush 46 of which is positioned by shaft 41 of motor 42. The amplitude of the output voltage of potentiometer 45, between movable brush 46 and the upper end of the winding of potentiometer 44, is, therefore, proportional to range R, and this output voltage is applied to stator winding 47 of electrical resolver 50, the rotor windings 48 and 49 of which are displaced by shaft 33 of motor 35 through the angle B. The amplitude of the output voltage of rotor winding 48 is therefore proportional to $R \cos B$, the north component of range, while the amplitude of the output voltage of rotor winding 49 is proportional to $R \sin S$, the east component of range.

Electrical resolver 50 is essentially a transformer having a primary field winding energized with a voltage corresponding to the hypotenuse of a vectorial right triangle in which one of the acute angles is the angle through which the rotor windings 48 and 49 are turned by shaft 33, the rotor windings being arranged in space quadrature and having induced in them by the field of stator winding 47 voltages corresponding to the product of the hypotenuse and the respective cosine and sine functions of the angle. Further details of the construction of resolver 50 may be had upon reference to Agins Patent No. 2,465,624 of March 24, 1949.

Referring now to own ship travel north unit 2 at the top of Fig. 2, a signal corresponding to the north travel of own ship O is supplied by a step-by-step transmitter in the dead reckoning equipment located elsewhere on the vessel and not shown, this signal being applied to terminals 51 of a conventional step-by-step motor 52 which converts the signal into a mechanical displacement of shaft 53 in the usual manner of step-by-step transmission equipment.

Also included in own ship travel north unit 2 is transformer 55 having its primary winding 54 energized by $\phi_1$ of the electric supply and its secondary winding 56 connected across resistance winding 57 of linear potentiometer 58. Movable brush 59 of potentiometer 58 is driven by output shaft 60 of mechanical differential 61 which is driven in part by shaft 53 of step-by-step motor 52. The output voltage of potentiometer 58, taken between movable contact 59 and center tap 62 of secondary winding 56 of transformer 55, is applied across control field winding 63 of motor 65 through switches 66 and 67. Main field winding 64 of motor 65 is energized from $\phi_2$ of the electric supply, so that motor 65 drives shaft 53' to the other input side of differential 61 driving output shaft 60 and movable contact 59 of winding 57.

With switch 12 closed in the "reset" condition, switch 66 lies in the position shown to energize control field winding 63 of motor 65. The energization of control field winding 63 of motor 65 causes the latter to drive contact 59 in the opposite direction back toward the zero position while motor 52 drives movable contact 59 of potentiometer 58 away from the zero position. The operation of motor 65 tends to restore the movable contact 59 to its zero position to thereby deenergize control field winding 63 and stop motor 65.

Switch 12 is intended to be opened at the first observation, so that relay winding 10 is deenergized and switches 66, 67 and 68 are actuated to the right by spring 69, thus removing the signal of potentiometer 58 from motor 65 and short circuiting control field winding 63 to stop motor 65. Closure of switch 68 also connects brake relay winding 70 to a source of power, $\phi_2$ to energize winding 70 and thereby apply brake 71 to shaft 53'. Thereafter, shaft 60 is driven only by motor 52 so that movable contact 59 of potentiometer 58 is adjusted in accordance with the north component signal and the output of potentiometer 58 is proportional to the north component of own ship travel, $c$, and is available at terminals 72.

The signal voltage $c$ at terminals 72 is applied to terminals 73 of own ship travel north memory unit 3, shown in Fig. 2 in the matching condition, where relay winding 14 is deenergized since key 16 is still open, as shown. Stator winding 74 of induction potentiometer 75 is energized from $\phi_1$ of the electric supply, while the output voltage of rotor winding 76 is matched against the input signal voltage $c$ at switch 77, and the difference in voltage is applied to control field winding 78 of motor 80 through switch 79, switches 77 and 79 being urged to the left by spring 81 connected to armature 82.

The main field winding 83 of motor 80 is energized by $\phi_2$, so that motor 80 drives shaft 84 which is coupled to the rotor winding 76 of induction potentiometer 75. Motor 80 therefore drives rotor winding 76 of induction potentiometer 75 until the output voltage of its rotor winding 76 is equal to the input signal voltage $c$ from unit 2 and keeps the output voltage continuously matched with the input signal voltage $c$ as the latter varies.

As each observation is made, the observer registers a "time-mark" by depressing key 16 which energizes relay 14 to draw armature 82 to the right and thereby actuate switches 77 and 79, which remove the control voltage $c$ from control field winding 78 of motor 80 with switch 77 and simultaneously short-circuit the control field winding 78 with switch 79 so that motor 80 is stopped and rotor winding 76 of potentiometer 75 remains stationary, thereby fixing the output voltage of potentiometer 75. Accordingly, when the observer closes time mark key 16 at the later, $m$th observation, the amplitude of the output voltage of rotor winding 76 across terminals 85 remains constant at a value proportional to $c_m$, the travel of own ship north in the time interval between the initial and the $m$th observations, i.e., unit 3 "remembers" the value $c_m$.

This value of output $c_m$ remains across terminals 85 until relay 14 is again deenergized by releasing key 16, and the matching operation of "memory" unit 3 is resumed. The amplitude of the signal voltage at terminals 85 is therefore proportional to the instantaneous output signal $c_m$ whenever key 16 is depressed and is proportional to the changing value $c$ between observations, i.e., when key 16 is released and the output voltage of rotor winding 76 of potentiometer 75 is matched with the input signal voltage $c$.

Referring now to initial range north unit 4 at the center of Fig. 2, the $R \cos B$ output voltage of range and bearing unit 1 is supplied as the input to unit 4. The rotor winding 87 of induction potentiometer 88 is driven by shaft 89 of induction motor 90. The stator winding 97 of potentiometer 88 is energized by $\phi_1$, while the main field winding 96 of motor 90 is energized by $\phi_2$. The output rotor winding 87 of potentiometer 88 is electrically connected in series with the rotor winding 48 of resolver 50 and terminals 86, so that the voltage at terminals 86 is the difference between the output voltage of rotor windings 48 and 87. Control field winding 91 of motor 90 is energized by the voltage at terminals 86 during the reset condition when switches 92 and 93 are urged to the left by relay winding 11. As shown in Fig. 2, the switches 92 and 93 are connected to the relay armature 94 which is normally urged to the right by spring 95. Motor 90 drives shaft 89 to rotate rotor winding 87 of potentiometer 88 to the position where the amplitude of the output voltage of rotor winding 87 is equal to the amplitude of the output voltage of rotor winding 48, and the control field winding 91 of motor 90 is deenergized thereby. The output voltage of rotor winding 87 is the output of unit 4, and is continuously matched to the output voltage of rotor winding 48 of resolver 50, which is $R \cos B$.

Relay 11 is deenergized by opening switch 13 at the initial "range mark," allowing spring 95 to close switches 92 and 93 to the right, thereby removing the signal at terminals 86 from motor 90 and short-circuiting the control field winding 91 to stop motor 90. Hence, the amplitude of the output voltage of rotor winding 87 is fixed and remains proportional to $R_1 \cos B_1$ for the remainder of the problem and the amplitude of the voltage at terminals 86 becomes proportional to $R \cos B - R_1 \cos B_1$.

Since the output terminals 85 of memory unit 3 are electrically connected in series with terminals 86, their series connection with the input terminals 100 of memory unit 5 results in the algebraic sum of the voltages being applied to terminals 100. Thus, the algebraic sum of the voltage $c_m$ at terminals 85 and the voltage $$R \cos B - R_1 \cos B_1$$

at terminals 86 is a value proportional to $$(R \cos B) - (R_1 \cos B_1) + c_m$$

at terminals 100.

Memory unit 5 is like memory unit 3 and, therefore, its description need not be repeated. It is operated by relay 15 whose armature 101 is moved thereby to the right against spring 102 when key 17 is closed. Memory unit 5 is in the matching condition when relay 15 is deenergized, thus matching its output voltage to the value of the $(R \cos B) - (R_1 \cos B_1) + c_m$ input voltage from terminals 100.

When relay 15 is energized at the $m$th "range mark" by depressing key 17, the amplitude of the output voltage of memory unit 5 across terminals 103 is matched to the input signal $(R_m \cos B_m) - (R_1 \cos B_1) c_m$ which is equal to $a_m$, as shown by Equation 1. This value of $a_m$ may be used as input signal to other computing equipment and also indicated by meter 105, which is essentially an alternating current voltmeter with its dial calibrated to indicate that value directly.

The required output signal proportional to the target travel east, i.e., the distance $b_m$, is produced in a circuit similar to north target travel circuit just described and composed of own ship travel north unit 2, corresponding memory unit 3, initial range north unit 4, corresponding memory unit 5 and rotor winding 48 of resolver 50 in which the signal proportional to $a_m$ is produced. Turning now to the "$b_m$" cardinal east component of the system, the signal proportional to own ship travel east, received from a step-by-step transmitter installed in the previously-mentioned dead reckoning equipment, is applied to terminals 106 of own ship travel each unit 6, which is constructed like the own ship travel north unit 2, previously described. The output signal across the terminals 107 of unit 6, which is proportional to own ship travel east, or distance $d$, is memorized in memory unit 7, which is like previously described memory unit 3 and is operated similarly by the extended armature 82 of relay 14, so that at each observation the output across terminals 108 of east memory unit 7 is proportional to the distance "$d_m$," shown in Fig. 1.

The voltage proportional to $R \sin B$ induced in the remaining winding 49 of resolver 50 in the range and bearing unit 1 has substracted therefrom the voltage $R_1 \sin B_1$ across the output terminals 109 of initial range east unit 8, which is operated by the extended armature 94 of relay 11 and is similar to initial range north unit 4. This value $R \sin B - R_1 \sin B_1$ is added to the signal $d_m$ from east memory unit 7 and the total signal $$(d_m + R \sin B - R_1 \sin B_1)$$

is applied to input terminals 110 of target travel east memory unit 9, which is constructed like memory units 3 and 5 and is operated by extended armature 101 of relay 15, so that the output across the terminals 111 of memory unit 9 is proportional to $$(d_m + R_m \sin B_m - R_1 \sin B_1)$$

the target travel east, or to the distance $b_m$ as shown by Equation 2. This output may be indicated directly on the scale of meter 112 which is a calibrated alternating current voltmeter like 105. The signal $b_m$ may also be used as an input signal to other computing equipment, as indicated by the arrows.

Although operation of the signalling system of this invention will be readily understood from the foregoing description, it will be briefly summarized. The instrument is first restored to the "reset" condition illustrated in Fig. 2, with switch 12 closed to hold switches 66, 67 and 68 of own ship north travel unit 2 and the corresponding switches in own ship east travel unit 6 in the closed position shown for unit 2, and with switch 13 also closed to hold switches 92 and 93 of north range unit 4 and the corresponding switches in east range unit 8 in the closed position shown for unit 4. At "reset" position key switches 16 and 17 are open.

At the initial observation, when own ship is at O and the target is at T in Fig. 1, switches 12 and 13 are opened to deenergize their respective relays 10, 11 and allow corresponding springs 69 and 95 to move the respective switches 66, 67, 68 and 92 and 93, and the corresponding switches in the east units 6 and 8, to the right. Accordingly, with switch 12 open, motor 65 in north travel unit 2 is stopped, so that only motor 52 drives shaft 60 and contact 59 of potentiometer 58 in accordance with input of own ship north travel and the output of unit 2 is a voltage proportional to the north component of own ship travel $c$. Similarly, the output of unit 6 is a voltage proportional to the east component of own ship travel $d$. Also, with switch 13 open, motor 90 is stopped and the output voltage $R_1 \cos B_1$ of initial north range unit 4 remains constant, as previously described, and the output voltage of initial range east unit 8 remains at $R_1 \sin B_1$.

As each range and bearing observation is made, and introduced at 19 and 18, the observer presses own ship travel "time mark" key 16 to open switches 77 and 79 in north memory unit 3, thereby stopping motor 80, and also opening corresponding switches and stopping the motor in east memory unit 7. This removes own ship north travel component input $c$ from memory unit 3 and own ship east travel component input $d$ from memory unit 7, but the units "remember" and hold constant the output values $c_m$ and $d_m$ until key 16 is released, whereupon the aforementioned matching operation in units 3 and 7 is resumed.

The range and target bearing preferably are established simultaneously so that the observer presses "range mark" key 17 at the same time that he presses the "time mark"

key 16, so relay 15 is energized to operate the target travel north and target travel east systems to establish the cardinal components of target travel. The outputs of $a_m$, the distance travelled north by the target, is given as a voltage across terminals 103 and also is directly indicated as distance on meter 105. Similarly, $b_m$, the distance travelled east by the target, is given as a voltage across terminals 111 and also is directly indicated as distance on meter 112. These cardinal distances are determined periodically by repeating the cycle established by closing and releasing of keys 16 and 17 as frequently as requirements dictate.

When an adjustment of the range and bearing detection equipment to the observed values is necessary, or when the range and bearing of the target are determined by some apparatus utilizing the time elapsed between a transmitted and a received signal as a measure of the range, the range and bearing of the target at a specific instant of time, $t_m$, may be established somewhat later than $t_m$, which is the time interval between the initial and the $m$th observations. Under these conditions, the keys 16 and 17 are not closed simultaneously, but two marks are required for each observation, the first or "time mark" obtained by closing key 16 to preserve the signal proportional to the travel of own ship during the time interval $t_m$, and the second or "range mark" obtained by closing key 17 to establish and preserve the signal proportional to the component of target travel. In other words the "time mark" is made before the "range mark" so that relay 14 is energized before relay 15 and $c_m$ is memorized before $R_m \cos B_m - R_1 \cos B_1$ is established. The amplitude of the signal voltage at terminals 100 is proportional to $a_m$, the distance travelled north by the target at the instant the range and bearing are established, at which time relay 15 is energized thereby preserving the output of memory unit 5 at a value equivalent to $a_m$.

It will be observed that relay winding 14 must remain energized until relay winding 15 is energized, so that key 16 is released as soon as key 17 is pressed to allow memory unit 3 to be matched to the new value of $c$ from own ship north travel unit 2 and become prepared for the $m+1$ "time mark." Relay winding 15 remains energized until the signal $a_m$ for the particular observation $m$ is recorded and key 17 is then released in order to allow memory unit 5 to be matched to the new input signal and be prepared for the $m+1$ "range mark." Similarly, relay winding 10 is deenergized at the initial "time mark" and relay winding 11 is deenergized at the initial "range mark" for the reason outlined above.

It will be understood that the induction potentiometers 75 and 88 in units 3 and 4, respectively, may be replaced by any electromechanical element in which the output voltage may be varied by displacement of its shaft, such as a resolver like 50 in unit 1, for instance, since the shaft position is unimportant to the operation of the corresponding unit. Also, the slide wire type potentiometers 45 and 58 in units 1 and 2, respectively, may be replaced by induction potentiometers like 75 and 88, without altering the operation of the system, and that other changes may be made in the illustrative circuit shown and described herein without departing from the invention, except as it may be limited by the scope of the appended claims.

We claim:

1. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage of said potentiometer according to said signal voltage, a transformer having a stator winding and a rotor winding, a second source of signal voltage, second electrical motive means energized by said second source, operative connections between said second motive means and said rotor winding, a third source of signal voltage connected to said stator winding for energizing the same, and means jointly connected to said rotor winding and said potentiometer output element for combining the output voltages thereof to produce a net voltage according to the algebraic sum of the first signal voltage and the output voltage of said transformer.

2. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a switch interposed between said source and said motive means, a transformer having a stator winding and a rotor winding, a second source of signal voltage representing an angle, second electrical motive means energized by said second source, operative connections between said second motive means and said rotor winding, a third source of signal voltage representing a distance connected to said stator winding for energizing the same, and means jointly connected to said rotor winding and said potentiometer output element for combining the output voltages thereof to produce a net voltage according to the algebraic sum of the first signal voltage at the instant of actuation of said switch and the output voltage of said transformer.

3. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a transformer having a stator winding and a rotor winding, a second source of signal voltage, second electrical motive means energized by said second source, operative connections between said second motive means and said rotor winding, a third source of signal voltage connected to said stator winding for energizing the same, means jointly connected to said rotor winding and said potentiometer output element for combining the output voltages thereof to produce a net voltage according to the algebraic sum of the first signal voltage and the output voltage of said transformer, and indicating means energized by the output of said combining means.

4. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a switch interposed between said source and said motive means, a transformer having a stator winding and a rotor winding, a second source of signal voltage representing an angle, second electrical motive means energized by said second source, operative connections between said second motive means and said rotor winding, a third source of signal voltage representing a distance connected to said stator winding for energizing the same, means jointly connected to said rotor winding and said potentiometer output element for combining the output voltages thereof to produce a net voltage according to the algebraic sum of the first signal voltage at the instant of actuation of said switch and the output voltage of said transformer, and indicating means energized by the output of said combining means.

5. In an electromechanical calculating system, the combination of a source of signal voltage, a potentiometer having an energized input element and a movable output element, electrical motive means connected in series with said source and output element, operative connections between said motive means and said output element whereby the motive means adjusts said output element to develop an output voltage according to said signal voltage, a transformer having an energized stator winding and a rotor winding, a second source of signal voltage, second electrical motive means energized by said second source, operative connections between said second motive means and said rotor winding, and series connections between said rotor winding and said potentiometer output element for combining the output voltages thereof to produce a net voltage according to the algebraic sum of the first signal voltage and the output voltage of said transformer.

6. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a transformer having a stator winding and a rotor winding, a second source of signal voltage, second electrical motive means energized by said second source, operative connections between said second motive means and said rotor winding, a second potentiometer having an energized input element and a movable output element, third electrical motive means, operative connections between said third motive means and the movable output element of said second potentiometer, connections between the transformer rotor winding and the output element of said second potentiometer for producing a third source of signal voltage, connections between said third source and third motive means for energizing the same, and means for combining the voltages of the output element of said first potentiometer and said third source to produce the algebraic sum thereof as the output of said system.

7. In an electromechanical calculating system, the combination of a source of signal voltage, a potentiometer having an energized input element and a movable output element, electrical motive means series-connected to said source and to said output element, operative connections between said motive means and said output element whereby the motive means adjusts said output element to develop an output voltage according to said signal voltage, a switch interposed between said source and said motive means, a transformer having a stator winding and a rotor winding, second electrical motive means energized in accordance with an angle, operative connections between said second motive means and said rotor winding, a second potentiometer having an energized input element and a movable output element, third electrical motive means, operative connections between said third motive means and the movable output element of said second potentiometer, series connections between the transformer rotor winding and the output element of said second potentiometer for producing a second source of signal voltage, connections between said second source and third motive means for energizing the latter, and means for combining the voltages of the output element of said first potentiometer and said second source to produce a net voltage according to the algebraic sum thereof.

8. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a transformer having a stator winding and a rotor winding, a second source of signal voltage, second electrical motive means energized by said second source, operative connections between said second motive means and said rotor winding, a second potentiometer having an energized input element and a movable output element, third electrical motive means, operative connections between said third motive means and the movable output element of said second potentiometer, connections between the transformer rotor winding and the output element of said second potentiometer for producing a third source of signal voltage, connections between said third source and third motive means for energizing the same, means for combining the voltages of the output element of said first potentiometer and said third source to produce a net voltage according to the algebraic sum thereof, and indicating means energized by the output of said combining means.

9. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a switch interposed between said source and said motive means, a transformer having a stator winding and a rotor winding, a second source of signal voltage representing an angle, second electrical motive means energized by said second source, operative connections between said second motive means and said rotor winding, a second potentiometer having an energized input element and a movable output element, third electrical motive means, operative connections between said third motive means and movable output element of said second potentiometer, connections between the transformer rotor winding and the output element of said second potentiometer for producing a third source of signal voltage, connections between said third source and third motive means for energizing the latter, means for combining the voltages of the output element of said first potentiometer and said third source to produce a net voltage according to the algebraic sum thereof at the instant of actuation of said switch, and indicating means energized by the output of said combining means.

10. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a transformer having a stator winding and a rotor winding, a second source of signal voltage, second electrical motive means energized by said second source, operative connections between said second motive means and said rotor winding, a third source of signal voltage connected to said stator winding for energizing the same, a second potentiometer having an energized input element and a movable output element, third electrical motive means jointly energized by the outputs of said transformer rotor winding and the movable output element of said second potentiometer, and means jointly connected to said first potentiometer output element and the input to said third motive means for combining the voltages thereof to produce a net voltage according to the algebraic sum thereof as the output of said system.

11. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a switch interposed between said source and said motive means, a transformer having a stator winding and a rotor winding, second electrical motive means energized in accordance with an angle, operative connections between said second motive means and said rotor winding, a second source of signal voltage representing a distance connected to said stator winding for energizing the same, a second potentiometer having an energized input element and a movable output element, third electrical motive means jointly energized by the outputs of said rotor winding and the movable output element of said second potentiometer, operative connections between said third motive means and said last movable element, and means jointly connected to said first potentiometer output element and the input to said third motive means for combining the output voltages thereof to produce an output for said system according to the algebraic sum of said voltages.

12. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a transformer having a stator winding and a rotor winding, a second source of signal voltage, second electrical motive means energized by said second source, operative connections between said second motive means and said rotor winding, a third source of signal voltage connected to said stator winding for energizing the same, a second potentiometer having an energized input element and a movable output element, third electrical motive means jointly energized by the outputs of said rotor winding and the movable output element of said second potentiometer, operative connections between said third motive means and the output element of said second potentiometer, and means jointly connected to said rotor winding and said first potentiometer output element and the output element of said second potentiometer for combining the voltages thereof to produce an output for said system according to the algebraic sum of said voltages.

13. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a transformer having a stator winding and a rotor winding, a second source of signal voltage, second electrical motive means energized by said second source, operative connections between said second motive means and said rotor winding, a second potentiometer having an energized input element and a movable output element, third electrical motive means, operative connections between said third motive means and the movable output element of said second potentiometer, connections between the transformer rotor winding and the output element of said second potentiometer for producing a third source of signal voltage, connections between said third source and third motive means for energizing the same, a third potentiometer having an energized input element and a movable output element connected to said transformer stator winding, a fourth source of signal voltage, fourth electrical motive means energized by said fourth source, operative connections between said fourth motive means and the movable element of said third potentiometer for varying the input voltage to said transformer stator winding in accordance with variations in said fourth signal source voltage, and means jointly connected to said first potentiometer output element and said third source for combining the voltages thereof to produce a net voltage according to the algebraic sum of said voltages as the output of said system.

14. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a switch interposed between said source and said motive means, a transformer having a stator winding and a rotor winding, a second source of signal voltage representing an angle, second electrical motive means energized by said second source, operative connections between said second motive means and said rotor winding, a third source of signal voltage representing a distance connected to said stator winding for energizing the same, a second potentiometer having an energized input element and a movable output element, third electrical motive means jointly energized by the outputs of said rotor winding and the movable output element of said second potentiometer, and means jointly connected to the input to said third motive means and said first potentiometer output element for combining the voltages thereof to produce a net voltage according to the algebraic sum of said voltages at the instant of actuation of said switch.

15. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a switch interposed between said source and said motive means, a transformer having a stator winding and a rotor winding, a second source of signal voltage representing an angle, second electrical motive means energized by said second source, operative connections between said second motive means and said rotor winding, a second potentiometer having an energized input element and a movable output element, third electrical motive means, operative connections between said third motive means and movable output element of said second potentiometer, connections between the output element of said second potentiometer and the transformer rotor winding and said third motive means for energizing the same, a third source of signal voltage representing a distance, a third potentiometer having an energized input element and a movable output element connected to said transformer stator winding, fourth electrical motive means energized by a fourth signal source and connected to the movable output element of said third potentiometer for adjusting the same in accordance with variations in said fourth signal source, and means jointly connected to said first potentiometer output element and the input to said third motive means for combining the voltages thereof to produce a net voltage according to the algebraic sum of said voltages.

16. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a switch interposed between said source and said motive means, a transformer having a stator winding and a rotor winding, a second source of signal voltage representing an angle, second electrical motive means energized by said second source, operative connections between said second motive means and said rotor winding, a third source of signal voltage representing a distance connected to said stator winding for energizing the same, a second potentiometer having an energized input element and a movable output element, third electrical motive means energized by the outputs of said rotor winding and the movable output element of said second potentiometer, means jointly connected to said first potentiometer output element and the input to said third motive means for combining the voltages thereof to produce a net voltage according to the algebraic sum of said voltages at the instant of actuation of said switch, and indicating means energized by the output of said combining means.

17. In an electromechanical calculating system, the combination of a source of signal voltage, a potentiometer having an energized input element and a movable output element, electrical motive means connected to said source and to said output element, operative connections between said motive means and said output element whereby the motive means adjusts said output element to develop an output voltage according to said signal voltage, a switch interposed between said source and said motive means, a transformer having a stator winding and a rotor winding, second electrical motive means energized in accordance with an angle, operative connections between said second motive means and said rotor winding, a second potentiometer having an energized input element and a movable output element, third electrical motive means, operative connections between said third motive means and movable output element of said second potentiometer, connections between the output element of said second potentiometer and the transformer rotor winding and said third motive means for energizing the latter, a third potenticmeter having an energized input element and a movable output element connected to said transformer stator winding, fourth electrical motive means energized by a third signal source and connected to the movable output element of said third potentiometer for adjusting the same in accordance with variations in said third signal source, means jointly connected to said first potentiometer output element and the input to said third motive means for combining the voltages thereof to produce a net voltage according to the algebraic sum of the voltages, and indicating means energized by the output of said combining means.

18. In an electromechanical calculating system for determining the coordinate cardinal distances travelled by a target, the combination of a source of voltage proportional to own ship travel in one cardinal direction, a potentiometer having an energized input element and a movable output element, electrical motive means jointly energized by the algebraic difference between the voltage of said output element and said source voltage, operative connections between said motive means and the movable element of said potentiometer, whereby the motive means adjusts said output element to develop an output voltage according to said own ship travel shource voltage, a transformer having a stator winding and a rotor winding, second electrical motive means energized in accordance with target bearing, operative connections between said second motive means and said rotor winding, a second source of signal voltage proportional to target range connected to said stator winding whereby a voltage proportional to the product of range and a function of target bearing is induced in said rotor winding, a second potentiometer having an energized input and a movable output element, third electrical motive means energized by the difference between the output voltages of said rotor winding and the output element of said second potentiometer, and means for combining the said difference voltage with the voltage of the output element of said first potentiometer to produce a voltage proportional to the cardinal distance travelled by the target in a predetermined interval of time.

19. In an electromechanical calculating system for determining the coordinate cardinal distances travelled by a target, the combination of a source of voltage proportional to own ship travel in one cardinal direction, a potentiometer having an energized input element and a movable output element, electrical motive means jointly energized by the a gebraic difference between the voltage of said output element and said source voltage, operative connections between said motive means and the movable element of said potentiometer, whereby the motive means adjusts said output element to develop an output voltage according to said own ship travel source voltage, a switch interposed between said source and said motive means for fixing the output of said potentiometer at will, a transformer having a stator winding and a rotor winding, second electrical motive means energized in accordance with target bearing, operative connections between said second motive means and said rotor winding, a second source of signal voltage proportional to target range connected to said stator winding whereby a voltage proportional to the product of range and a function of target bearing is induced in said rotor winding, a second potentiometer having an energized input and a movable output element, third electrical motive means energized by the difference between the output voltages of said rotor winding and the output element of said second potentiometer, and means for combining the said difference voltage with the voltage of the output element of said first potentiometer to produce a voltage proportional to the cardinal distance travelled by the target in a predetermined interval of time.

20. In an electromechanical calculating system for determining the coordinate cardinal distances travelled by a target, the combination of a source of voltage proportional to own ship travel in one cardinal direction, a potentiometer having an energized input element and a movable output element, electrical motive means jointly energized by the algebraic difference between the voltage of said output element and said source voltage, operative connections between said motive means and the movable element of said potentiometer, whereby the motive means adjusts said output element to develop an output voltage according to said own ship travel source voltage, a transformer having a stator winding and a rotor winding, second electrical motive means energized in accordance with target bearing, operative connections between said second motive means and said rotor winding, a second source of signal voltage proportional to target range connected to said stator winding whereby a voltage proportional to the product of range and a function of target bearing is induced in said rotor winding, a second potentiometer having an energized input and a movable output element, third electrical motive means energized by the difference between the output voltages of said rotor winding and the output element of said second potentiometer, means for combining the said difference voltage with the voltage of the output element of said first potentiometer to produce a voltage proportional to the cardinal distance travelled by the target in a predetermined interval of time, and indicating means energized by the output of said combining means for directly indicating said cardinal distance travelled by the target.

No references cited.